US007646556B1

(12) United States Patent
Kose et al.

(10) Patent No.: US 7,646,556 B1
(45) Date of Patent: Jan. 12, 2010

(54) SYSTEMS AND METHODS FOR DETECTING FLAWS ON A STORAGE DISK

(75) Inventors: K. Rickmer E. Kose, San Francisco, CA (US); Bin Liu, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 377 days.

(21) Appl. No.: 11/484,893

(22) Filed: Jul. 10, 2006

Related U.S. Application Data

(60) Provisional application No. 60/697,733, filed on Jul. 8, 2005.

(51) Int. Cl.
*G11B 5/40* (2006.01)
(52) U.S. Cl. .......................................... 360/31; 360/25
(58) Field of Classification Search ........................ None
See application file for complete search history.

(56) References Cited

U.S. PATENT DOCUMENTS 5,822,139 A * 10/1998 Ayabe ........................ 360/31
6,175,459 B1 * 1/2001 Tomita ........................ 360/53
6,504,662 B2 * 1/2003 Sobey ......................... 360/25
7,342,741 B1 * 3/2008 Emo et al. ............... 360/78.07

FOREIGN PATENT DOCUMENTS

JP          01021778 A   *   1/1989

* cited by examiner

*Primary Examiner*—Jason C Olson
(74) *Attorney, Agent, or Firm*—Westman, Champlin & Kelly, P.A.

(57) ABSTRACT

A flaw scan system for detecting a location of first and second types of location specific anomalies on a storage disk of a hard disk drive comprising a write system, a read system, and first and second anomaly location systems. The write system writes a first set of bits to the storage disk in first and second data patterns. The read system reads the first set of bits from the storage disk. The first anomaly location system determines locations of the first type of location specific anomaly based on the first data pattern. The second anomaly location system determines locations of the second type of location specific anomaly based on the second data pattern.

47 Claims, 5 Drawing Sheets

| | | | | | | | | | | |
|---|---|---|---|---|---|---|---|---|---|---|
| 0 | 0 | 1 | 1 | 0 | 0 | 1 | 1 | 0 | 0 | M+8 |
| 1 | 1 | 0 | 0 | 1 | 1 | 0 | 0 | 1 | 1 | M+7 |
| 0 | 1 | 1 | 0 | 0 | 1 | 1 | 0 | 0 | 1 | M+6 |
| 0 | 0 | 1 | 1 | 0 | 0 | 1 | 1 | 0 | 0 | M+5 |
| 0 | 0 | 1 | 1 | 0 | 0 | 1 | 1 | 0 | 0 | M+4 |
| 0 | 0 | 0 | 0 | 0 | 0 | 0 | 0 | 0 | 0 | M+3 |
| 0 | 1 | 1 | 0 | 0 | 1 | 1 | 0 | 0 | 1 | M+2 |
| 0 | 0 | 1 | 1 | 0 | 0 | 1 | 1 | 0 | 0 | M+1 |
| 1 | 1 | 0 | 0 | 1 | 1 | 0 | 0 | 1 | 1 | M 0 |
| 0 | 1 | 1 | 0 | 0 | 1 | 1 | 0 | 0 | 1 | M-1 |
| 1 | 0 | 0 | 1 | 1 | 0 | 0 | 1 | 1 | 0 | M-2 |
| 0 | 0 | 1 | 1 | 0 | 0 | 1 | 1 | 0 | 0 | M-3 |
| 0 | 0 | 1 | 1 | 0 | 0 | 1 | 1 | 0 | 0 | M-4 |
| 1 | 1 | 0 | 0 | 1 | 1 | 0 | 0 | 1 | 1 | M-5 |
| 1 | 0 | 0 | 1 | 1 | 0 | 0 | 1 | 1 | 0 | M-6 |
| 0 | 0 | 0 | 0 | 0 | 0 | 0 | 0 | 0 | 0 | M-7 |
| 0 | 0 | 1 | 1 | 0 | 0 | 1 | 1 | 0 | 0 | M-8 |

FIG. 5

| | | | | | | | | | | |
|---|---|---|---|---|---|---|---|---|---|---|
| 0 | 1 | 1 | 1 | 1 | 0 | 0 | 0 | 0 | 1 | M+8 |
| 1 | 1 | 0 | 0 | 1 | 1 | 0 | 0 | 1 | 1 | M+7 |
| 1 | 1 | 0 | 0 | 0 | 0 | 1 | 1 | 1 | 1 | M+6 |
| 0 | 0 | 1 | 1 | 0 | 0 | 1 | 1 | 0 | 0 | M+5 |
| 0 | 0 | 1 | 1 | 1 | 1 | 0 | 0 | 0 | 0 | M+4 |
| 0 | 0 | 0 | 0 | 0 | 0 | 0 | 0 | 0 | 0 | M+3 |
| 0 | 1 | 1 | 0 | 0 | 1 | 1 | 0 | 0 | 1 | M+2 |
| 0 | 0 | 0 | 0 | 1 | 1 | 1 | 1 | 0 | 0 | M+1 |
| 1 | 1 | 0 | 0 | 1 | 1 | 0 | 0 | 1 | 1 | M 0 |
| 1 | 1 | 1 | 1 | 0 | 0 | 0 | 0 | 1 | 1 | M-1 |
| 1 | 0 | 0 | 1 | 1 | 0 | 0 | 1 | 1 | 0 | M-2 |
| 0 | 0 | 1 | 1 | 1 | 1 | 0 | 0 | 0 | 0 | M-3 |
| 0 | 0 | 1 | 1 | 0 | 0 | 1 | 1 | 0 | 0 | M-4 |
| 1 | 1 | 1 | 1 | 0 | 0 | 0 | 0 | 1 | 1 | M-5 |
| 0 | 0 | 0 | 0 | 0 | 0 | 0 | 0 | 0 | 0 | M-6 |
| 1 | 1 | 0 | 0 | 1 | 1 | 0 | 0 | 1 | 1 | M-7 |
| 0 | 0 | 1 | 1 | 1 | 1 | 0 | 0 | 0 | 0 | M-8 |

FIG. 6

SYSTEMS AND METHODS FOR DETECTING FLAWS ON A STORAGE DISK

RELATED APPLICATIONS

Priority is claimed from U.S. Provisional Patent Application Ser. No. 60/697,733 filed on Jul. 8, 2005, which is incorporated by reference in its entirety.

FIELD OF THE INVENTION

The present invention relates to digital storage devices and, more particularly, to systems and methods for detecting flaws in hard disk drive systems.

BACKGROUND OF THE INVENTION

A disk drive is a digital data storage device that stores information on concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the magnetic transducer while the transducer is adjacent to (above or below) the desired track. The write signal creates a variable magnetic field at a gap portion of the magnetic transducer that induces magnetically polarized transitions on the desired track. The magnetically polarized transitions are representative of the data being stored.

Reading is performed by sensing the magnetically polarized transitions on a track with the magnetic transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk. In a seek mode, the transducer is moved radially inwardly or outwardly to arrange the transducer above a desired track. In an on-track mode, the transducer reads data from or writes data to the desired track. In the on-track mode, the transducer is moved radially inwardly and outwardly to ensure that the transducer is in a proper position relative to the desired track. The movement of the transducer in on-track mode is referred to as track following.

Modern hard disk drives employ a dual-actuator system for moving the transducer radially relative to the disk. A first stage of a dual-actuator system is optimized for moving the transducer relatively large distances. A second stage of a dual-actuator system is optimized for moving the transducer relatively small distances.

Upon initial manufacture and assembly into a hard disk drive, a storage disk contains no information. A low-level formatting step is performed at the factory during which enough data is written to the disk to allow for subsequent partitioning and high-level formatting by the computer operating system. In particular, during low-level formatting, a specialized system writes control structures to the storage disk that outline the positions of the tracks and sectors of the disk. The control structures include embedded servo data to control the head actuator as will be described in detail below.

After control structures defining the positions of the tracks and sectors have been written to the storage disk, certain predefined test patterns are written to the disk and then read back to determine the existence and location of any location specific anomalies on the storage disk. The term "location specific disk anomalies" as used herein refers to any flaw or defect in the storage disk itself or any external factor that repeatedly disrupts the hard disk drive system at a particular location within the previously defined system of tracks and sectors. This process is referred to as the flaw scan process.

One common example of a location specific disk anomaly includes defects in the magnetic storage media that alter the magnetic properties of the storage disk itself (media defects). For example, if the material at a particular location on the disk is not of the proper composition, the material may not be properly magnetized during the write process such that the data at that location may not be read during the read process.

Another example of a location specific anomaly is commonly referred to as a thermal asperity (TA). A thermal asperity is caused by some factor that causes the temperature of the magnetic transducer to increase. An increase in the temperature of the transducer interferes with the read signal generated thereby. Common causes of thermal asperities include perturbations in the surface of the disk and/or external contaminants on the disk surface that frictionally engage the head and cause brief spikes in head temperature.

During a conventional flaw scan process a single test pattern is written to the entire disk and then read back. A typical test pattern, referred to as the T4 pattern, is a square wave pattern which has 50% duty cycle and has a cycle of four times that of the read/write clock. The read signal generated by the magnetic transducer in response to such test pattern is a sinusoidal-like signal that is analyzed for disruptions indicative of media defects and/or spikes indicative of thermal asperities. The locations of any such location specific disk anomalies are stored, and any data sectors containing such anomalies are mapped out as bad sectors.

Although the conventional flaw scan process works well with Giant Magneto Resistive (GMR) heads, newer disk drive systems employ Tunneling Magneto Resistive (TuMR) heads. The response to TAs from TuMR heads has much smaller amplitude and shorter duration than that from GMR heads. Read channels that were designed to detect TAs from GMR heads are much less sensitive to TAs from TuMR heads. Missing a real TA in flaw scan could lead to serious consequences. For example, the integrity of user's data may be compromised and/or the read head may be damaged because of repeated contacts with the contaminants that cause the TA itself.

One way to enhance the sensitivity of the TA detector in the read channel is to apply a greater gain in the variable gain amplifier (VGA) in the analog front end (AFE). However, the increased gain would also cause the amplitude of signals free from TA to be large enough to saturate the dynamic signal range of the analog to digital converter (ADC). Consequently, the signals free from TA suffer distortion after ADC and may not be appropriate for defect detection.

One of the important differences between TAs and defects is that TAs can be observed from the read signal regardless of the data pattern written in the media. Therefore, a test pattern may be written that results in a read signal of very small amplitude when there is no TA. One example of such test pattern is the DC pattern, referred to as the T0 pattern. Such signals cannot be used to detect defects, but a greater VGA gain can be applied to enhance TA detection sensitivity.

Using the conventional flaw scan techniques, two read-passes would be necessary to capture all media defects, because the T0 pattern is insensitive to magnetic defects but effectively uncovers TAs, and the T4 pattern (or and other higher-frequency patterns) is less sensitive to TAs but pick out media defects well. For each track, one write/read pass would be conducted with one test pattern such as a T4 pattern and reduced VGA gain to enable accurate detection of media defects, and a second write/read pass would be conducted with another test pattern such as a T0 pattern and increased VGA gain to enable accurate detection of thermal asperities. Compared to the situation with a GMR head where one write/read pass for each track with the T4 pattern is sufficient to detect both media defects and TAs, this approach doubles the flaw scan process and therefore results in longer time and higher cost in the manufacturing process.

The need thus exists for flaw scan systems and methods that effectively detect both media defects and thermal asperities, while allowing the duration of the flaw scan process to be kept at acceptable levels.

SUMMARY OF THE INVENTION

The present invention may be embodied as a flaw scan system for detecting a location of first and second types of location specific anomalies on a storage disk of a hard disk drive comprising a write system, a read system, and first and second anomaly location systems. The write system writes a first set of bits to the storage disk in first and second data patterns. The read system reads the first set of bits from the storage disk. The first anomaly location system determines locations of the first type of location specific anomaly based on the first data pattern. The second anomaly location system determines locations of the second type of location specific anomaly based on the second data pattern.

The present invention may also be implemented as a method of detecting a location of first and second types of location specific anomalies on a storage disk of a hard disk drive. One example method comprises the following steps. A first set of bits is written to the storage disk in first and second data patterns. The first set of bits is read from the storage disk. Locations of the first type of location specific anomaly are determined based on a first portion of the first set of bits read from the storage disk associated with the first data pattern. Locations of the second type of location specific anomaly are determined based on a second portion of the first set of bits read from the storage disk associated with the second data pattern.

BRIEF DESCRIPTION OF THE DRAWINGS

FIG. 5 schematically represents data patterns written to the storage disk during a second example flaw scan process embodying the principles of the present invention;

FIG. 6 schematically represents data patterns written to the storage disk during a third example flaw scan process embodying the principles of the present invention.

DETAILED DESCRIPTION OF THE PREFERRED EMBODIMENT

Figure 1:
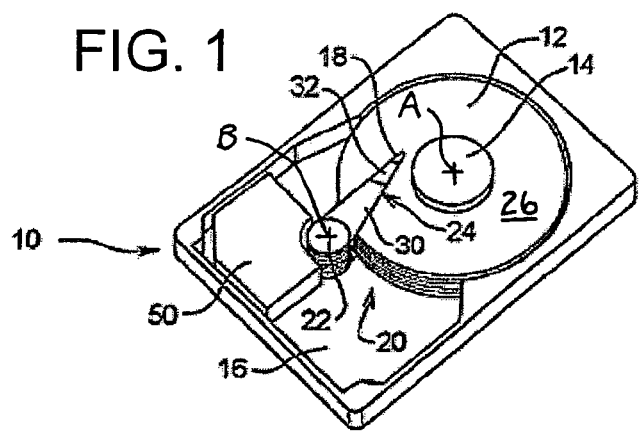
FIG. 1 is a perspective view of a mechanical portion of an example hard disk drive that may be used to embody the principles of the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
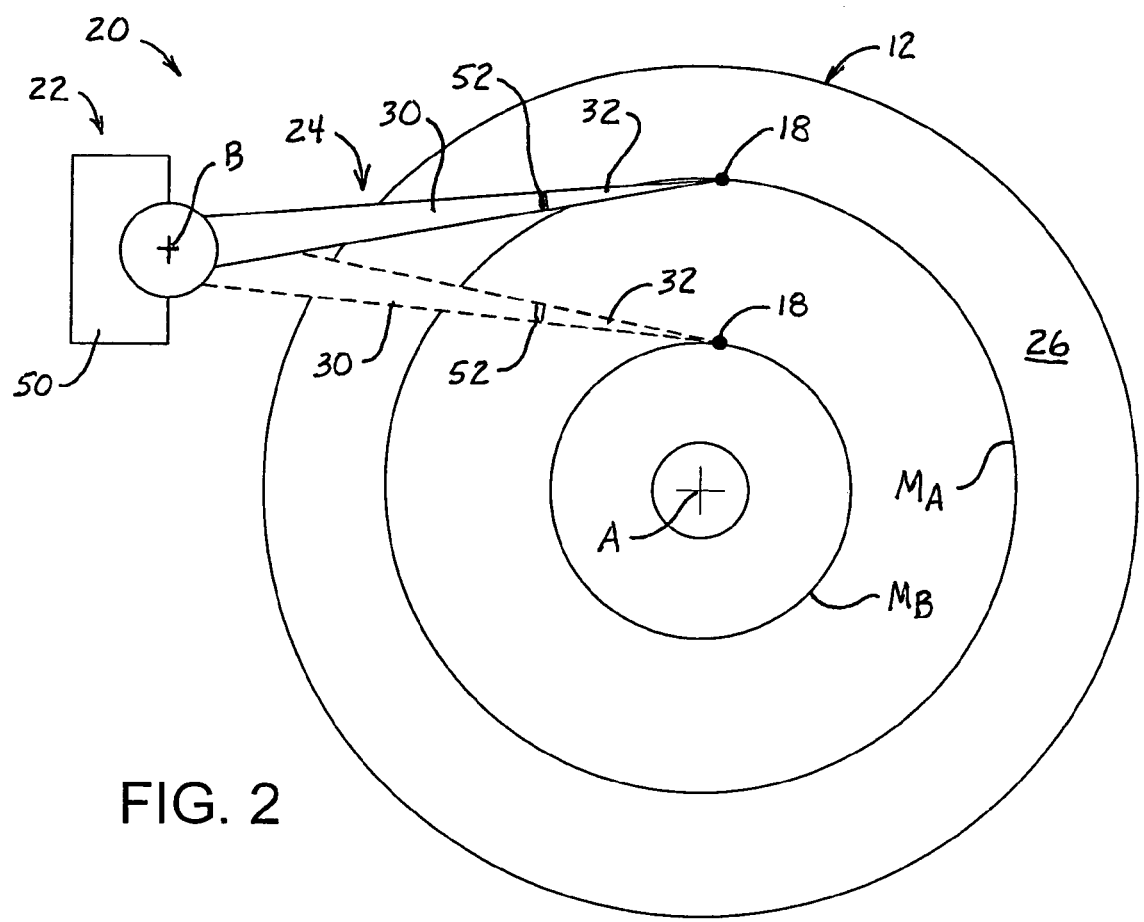
FIG. 2 is a schematic representation of some of the components of the mechanical portion of the example disk drive of FIG. 1.

FIGS. 1 and 2 illustrate a mechanical portion of an example disk drive 10 that may be configured to use a flaw scan system or method of the present invention. The disk drive 10 further comprises control electronics typically including a preamplifier, a read/write channel, a servo control unit, a random access memory (RAM), and read only memory (ROM), spindle motor, and dual-stage driving electronics. The electronic portion is or may be conventional and will not be described herein beyond what is necessary for a complete understanding of the present invention.

FIGS. 1 and 2 show that the mechanical portion of the disk drive 10 includes a disk 12 that is rotated by a spin motor 14. The spin motor 14 is mounted to a base plate 16. The disk drive 10 includes at least one and typically a plurality of disks 12. During use, the disk 12 is rotated about a spindle axis A.

The disk drive 10 further comprises what is commonly referred to as a head 18. The head 18 comprises or supports the magnetic read/write transducer described above; the head 18 will be referred to herein as the component of the disk drive 10 that reads data from and writes data to the disk 12.

FIGS. 1 and 2 further illustrate a positioning system 20 of the disk drive 10. The positioning system 20 comprises a bearing assembly 22 that supports at least one actuator arm assembly 24 for rotation about a bearing axis B. Each of the disks 12 comprises one or two recording surfaces 26. The actuator arm assembly 24 supports each head 18 adjacent to one recording surface 26 of one of the disks 12. Typically, the bearing assembly 22 will support one actuator arm assembly 24 and associated head 18 adjacent to each of the recording surfaces 26 of each of the disks 12.

FIG. 2 identifies arbitrary first and second tracks Ma and Mb on the disk 12, and the actuator arm assembly 24 is shown in an initial position by solid lines and in a target position by broken lines. The actuator arm assemblies 24 allow each head 18 to be moved as necessary to move from the first (initial) track Ma to the second (target) track Mb in seek mode and then follow the target track Mb in track following mode.

The positioning system 20 depicted in FIGS. 1 and 2 is a dual-stage system. Accordingly, each actuator arm assembly 24 comprises a first actuator structure 30 and a second actuator structure 32. For ease of illustration, FIGS. 1 and 2 depict the first and second actuator structures 30 and 32 as comprising first and second elongate actuator arms and the actuator structures 30 and 32 may be implemented as shown in FIGS. 1 and 2.

The actuator structures 30 and 32 may, however, be implemented using other structures or combinations of structures. Initially, the actuator arm assembly 24 may be a single stage actuator. As another example, the first actuator structure 30 may comprise an elongate arm that rotates about a first axis, while the second actuator structure 32 may comprise a suspension assembly rigidly connected to a distal end of the first actuator. In this case, the first actuator is able to rotate about an actuator axis, while the head 18 would be suspended from the second actuator for linear movement generally inwardly and outwardly relative to the position of the first actuator. The actuator arm assembly 24 may thus take any number of physical forms, and the scope of the present invention should not be limited to the exemplary actuator arm assembly 24 depicted in FIGS. 1 and 2.

FIG. 2 also illustrates that the exemplary actuator structures 30 and 32 of the positioning system 20 form part of a first actuator 50 and a second actuator 52, respectively. For the purposes of the following discussion, the first actuator 50 is identified as a voice coil motor (VCM) and the second actuator 52 is identified as a piezoelectric transducer (PZT). However, if the actuator arm assembly 24 is a two-stage actuator, the actuators 50 and 52 may be formed by any device capable of moving based on an electrical control signal as will be described below.

Figures 3, 4:
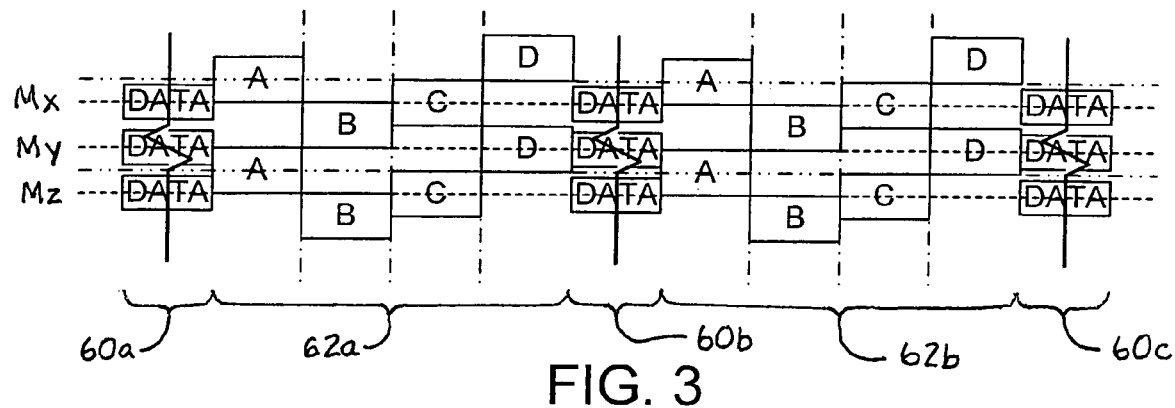
FIG. 3 schematically depicts data and servo sectors of several tracks of the hard disk drive of FIG. 1.
FIG. 4 schematically represents data patterns written to the storage disk during a first example flaw scan process embodying the principles of the present invention.

Turning now to FIG. 3 of the drawing, depicted therein is a schematic representation of three tracks Mx, My, and Mz. FIG. 3 shows that each of the tracks Mx, My, and Mz comprises a plurality of data sectors 60, where each data sector 60 is separated from the data sectors adjacent thereto by servo sectors 62. The servo sectors 62 contain servo control information that facilitates seek and track following operations. It should be understood that FIG. 3 is not to scale, as the data sectors 60 are generally much larger than the servo sectors 62.

With the foregoing basic understanding of the operation of the example disk drive system 10, several example data sets for flaw scan systems and methods of the present invention will now be described in further detail with reference to FIGS. 4-6. Each of the example data sets described below comprises at least two types of data patterns. Each type of data pattern is adapted to indicate the presence of a particular type of anomaly expected on the disk surface 26. The entire data set, which comprises a plurality (two or more) data patterns, is initially written to the disk at one time. Preferably, the data patterns forming the data sets are written in the most time efficient manner possible. The data set is subsequently read, again (preferably) in the most time efficient manner, to determine the presence or absence of both types of anomaly.

FIG. 4 depicts a first example of a data set 70 of a flaw scan system constructed in accordance with, and embodying, the principles of the present invention. In particular, FIG. 4 schematically represents data stored in a plurality of tracks M−4 through M+4 by the first example data set 70 of the present invention. FIG. 4 further illustrates a first region 72 associated with a first type of location specific anomaly with broken lines and a second region 74 associated with a second type of location specific anomaly with solid lines.

In the example depicted in FIG. 4, the first type of location specific anomaly is associated with a media defect, while the second type of location specific anomaly is associated with a thermal asperity. The principles of the present invention may be applied to any two types of location specific anomalies where the two types of location specific anomalies are ideally sensed differently by the head transducer and read channel.

In the example flow scan system 70 depicted in FIG. 4, a first data set comprising first and second types of data patterns is written to the storage disk. FIG. 4 further shows that the first and second types of data patterns in the example system 70 are written to alternating tracks within the range M−4 to M+4. The following Table A correlates data patterns with tracks as illustrated in FIG. 4:

TABLE A

| TRACK | PATTERN TYPE | EXAMPLE DATA PATTERN |
| --- | --- | --- |
| M − 4 | First | T4 |
| M − 3 | Second | T0 |
| M − 2 | First | T4 |
| M − 1 | Second | T0 |
| M 0 | First | T4 |
| M + 1 | Second | T0 |
| M + 2 | First | T4 |
| M + 3 | Second | T0 |
| M + 4 | First | T4 |

The T4 data pattern refers to a pattern of alternating pairs of zeros and ones, where each zero and one occupies one read/write clock cycle. Reading over such a test pattern at the same read/write clock rate, the head transducer produces a periodical waveform that is substantially close to a sinusoidal signal and whose frequency is one quarter of the read/write clock. The T0 data pattern refers to a pattern of consecutive zeros or ones that, ideally, results in the head transducer output signal being equal to a baseline level.

In a disk 12 without anomalies of any kind, the head transducer output signal generated for the first data pattern will thus be a clean nearly sinusoidal signal that, in the frequency domain, is represented by a stable signal having a magnitude at or above a first predetermined level. In a flaw scan system using the example data set 70, the location specific anomaly at the first location 72 will cause the head transducer output signal to drop below the first predetermined level over multiple cycles of the T4 signal when the T4 signals on tracks M+4 and M+2 are read at the location 72.

Typically, the head transducer output signal drops below the first predetermined threshold level over multiple cycles of the T4 signal. If the flaw scan system detects a signal drop out in tracks M+4 and M+2 that indicates the presence of an anomaly of the first type at this location 72 on these tracks M+4 and M+2.

In the example disk surface depicted in FIG. 4, the anomaly at the first location 72 does not extend beyond the range M+2 through M+4, but this cannot be presumed by the flaw scan system using the data set 70. The system will thus assume that the same anomaly is present at the adjacent and intervening tracks M+5, M+3, and M+1 where direct measurements for the first type of location specific anomaly have not been taken. A separate check (writing and reading the first pattern type) of these tracks M+1 and M+5 may be conducted to verify the presence or absence of an anomaly at that location in those tracks M+5, M+3, and M+1.

A disk 12 without anomalies will yield a head transducer output signal for the second data pattern that is at or below a second predetermined level. However, where the second type of location specific anomaly is located at the second location 74, the head transducer signal will spike up when the T0 signal on track M−3 is read at that location 74. If the flaw scan system 70 detects a spike in track M−3 that indicates the presence of an anomaly of the second type, the system 70 may assume that the same anomaly is present at the adjacent tracks M−2 and M−4 where a direct measurement for the second type of location specific anomaly has not been taken. Again, a separate check (writing and reading the second pattern type) of these tracks M−2 and M−4 may be conducted to verify the presence or absence of an anomaly at that location in those tracks M−2 and M−4.

Once the presence of a location specific anomaly is detected, the approximate location of the location specific anomaly can be identified for the purpose of mapping out a sector based on servo and other control data stored on the disk. The identification of the approximate location of a given location specific anomaly, once located, is conventional and will not be described herein in detail.

Although the first and second patterns used by the example data set 70 are the T4 and T0 patterns, respectively, other data patterns may be used when implementing a flaw scan system of the present invention. Generally speaking, the second pattern is associated with a second frequency that is different from the first frequency associated with the first pattern.

Turning now to FIG. 5, a second example of a data set 80 for a flaw scan system constructed in accordance with, and embodying, the principles of the present invention is illustrated. FIG. 5 schematically represents the data set 80 stored in a plurality of tracks M−8 through M+8. FIG. 5 further illustrates a first region 82 associated with a first type of location specific anomaly with broken lines and a second region 84 associated with a second type of location specific anomaly with solid lines.

The first type of location specific anomaly at location 82 is associated with a media defect, while the second type of location specific anomaly at location 84 is associated with a thermal asperity. Again, the principles of the present invention may be applied to any two types of location specific anomaly where the two types of location specific anomaly are ideally sensed differently by the head transducer.

In the example flaw scan system depicted in FIG. 5, the data set 80 comprises first and second types of data patterns that have been written to the storage disk 12. As shown in FIG. 5, the first and second types of data patterns are written to tracks within the range M−8 to M+8. The following Table B correlates data patterns with tracks as illustrated in FIG. 5:

TABLE B

| TRACK | PATTERN TYPE | EXAMPLE DATA PATTERN |
|---|---|---|
| M − 8 | First | T4 |
| M − 7 | Second | T0 |
| M − 6 | First | T4 |
| M − 5 | First | T4 |
| M − 4 | First | T4 |
| M − 3 | First | T4 |
| M − 2 | First | T4 |
| M − 1 | First | T4 |
| M 0 | First | T4 |
| M + 1 | First | T4 |
| M + 2 | First | T4 |
| M + 3 | Second | T0 |
| M + 4 | First | T4 |
| M + 5 | First | T4 |
| M + 6 | First | T4 |
| M + 7 | First | T4 |
| M + 8 | First | T4 |

The T0 data pattern is thus written once every ten tracks in the example flaw scan system 80 rather than every other track as in the example flaw scan system 70 described above. One or both of the data patterns thus may be spaced from adjacent patterns of the same type by more than a single track. The spacing of the either of the data patterns thus need not be regular but can instead be determined based on factors such as the dimensions of the location specific anomaly to be expected.

In the example flaw scan system using the data set 80, the location specific anomaly at the first location 82 will cause the head transducer output signal to drop below the first predetermined level when the T4 signals on tracks M+8, M+7, and M+6 are read at the location 82. If the flaw scan system 80 detects a signal drop out in tracks M+8, M+7, and M+6 that indicates the presence of an anomaly of the first type but not at tracks M+9 or M+5, the system 80 may assume that the same anomaly is contained within tracks M+8, M+7, and M+6.

Because the second type of location specific anomaly is located at the second location 84, the head transducer signal will spike up when the T0 signal on track M−7 is read at that location 84. The flaw scan system using the data set 80 may assume that the anomaly at the second location is present on either side of the track (M+2 through M−15) containing the first data pattern. As described above, a separate check (writing and reading the first pattern type) of the tracks M+2 and M−15 may be conducted to verify the presence or absence of an anomaly at that location in those tracks.

Again, data patterns other than T4 and T0 may be used when implementing a flaw scan system of the present invention.

FIG. 6 illustrates a third example data pattern 90 for a flaw scan system of the present invention. The pattern 90 depicted in FIG. 6 employs three pattern types and is configured to detect first, second, and third types of anomalies. These three different types of anomalies are schematically indicated at first, second, and third locations 92, 94, and 96, respectively, in FIG. 6.

In particular, FIG. 6 schematically represents data stored in a plurality of tracks M−8 through M+8. The first location extends at least partly across tracks M+6 through M+8, inclusive. The second location 94 extends at least partly across tracks M−8 through M−1, inclusive. The third location 96 extends at least partly across tracks M+2 through M+4, inclusive. The following Table D correlates data pattern types with tracks as illustrated in FIG. 6:

TABLE C

| TRACK | PATTERN TYPE | EXAMPLE DATA PATTERN |
|---|---|---|
| M − 8 | Third | T8 |
| M − 7 | First | T4 |
| M − 6 | Second | T0 |
| M − 5 | Third | T8 |
| M − 4 | First | T4 |
| M − 3 | Third | T8 |
| M − 2 | First | T4 |
| M − 1 | Third | T8 |
| M 0 | First | T4 |
| M + 1 | Third | T8 |
| M + 2 | First | T4 |
| M + 3 | Second | T0 |
| M + 4 | Third | T8 |
| M + 5 | First | T4 |
| M + 6 | Third | T8 |
| M + 7 | First | T4 |
| M + 8 | Third | T8 |

The T0 data pattern is thus written once every nine tracks in the example flaw scan system 90 (e.g., tracks M+3 and M−6), while the T4 and T8 data patterns are alternately written four times between each T0 pattern. In the system 90, the third pattern is selected to help identify the third type of location specific anomaly.

Figure 7:
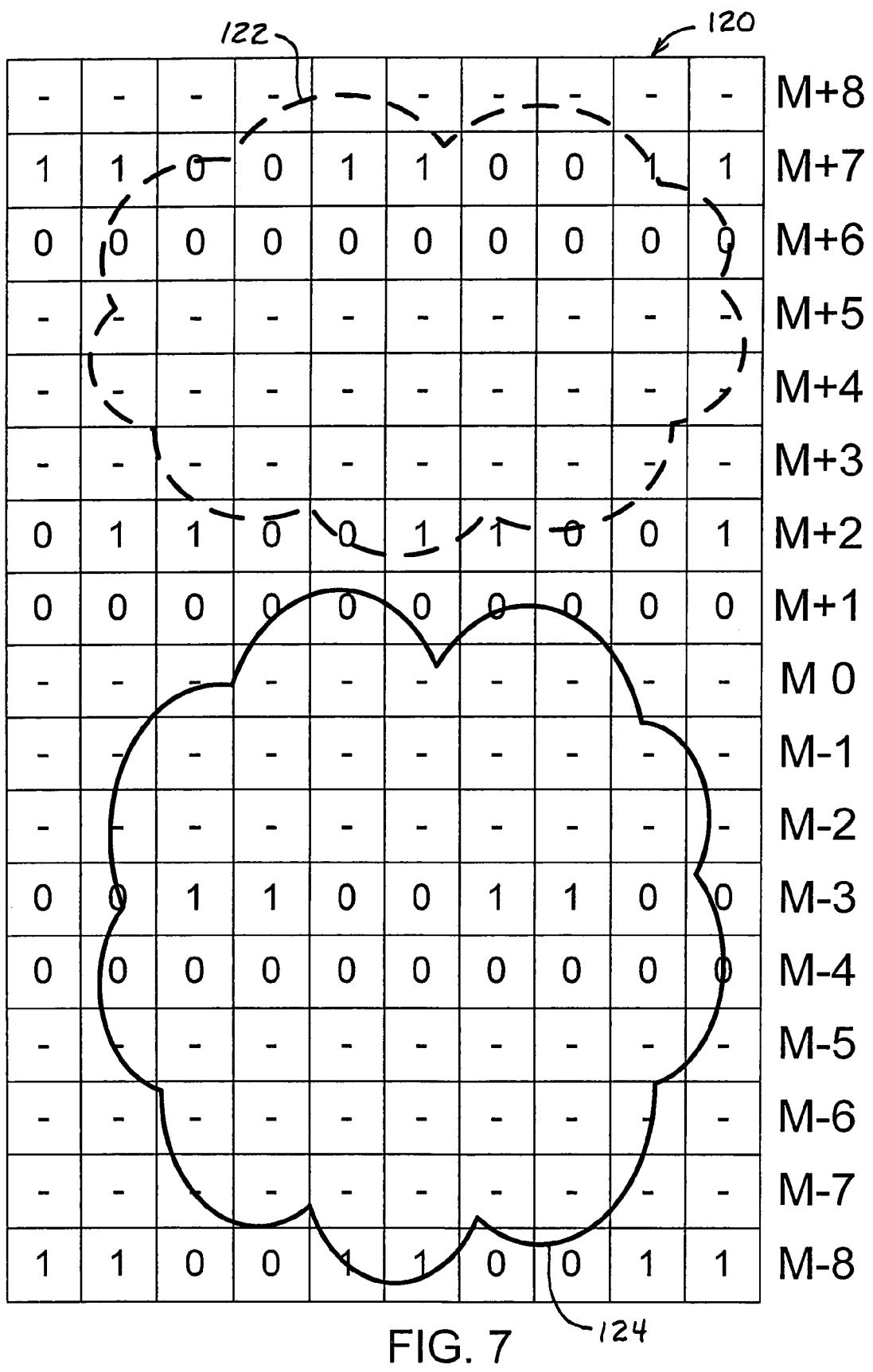
FIG. 7 schematically represents data patterns written to the storage disk during a fourth example flaw scan process embodying the principles of the present invention.

FIG. 7 illustrates a fourth example of a data pattern 120 of another example flaw scan system 120 constructed in accordance with, and embodying, the principles of the present invention. FIG. 7 schematically represents data stored in a plurality of tracks M−8 through M+8 by the third example flaw scan system 120. FIG. 7 further illustrates a first region 122 associated with a first type of location specific anomaly with broken lines and a second region 124 associated with a second type of location specific anomaly with solid lines.

The principles of the present invention do not require that every track be written to and read from. The following Table D correlates data patterns with tracks as illustrated in FIG. 7:

TABLE D

| TRACK | PATTERN TYPE | EXAMPLE DATA PATTERN |
| --- | --- | --- |
| M + 8 | Any | none |
| M + 7 | First | T4 |
| M + 6 | Second | T0 |
| M + 5 | Any | none |
| M + 4 | Any | none |
| M + 3 | Any | none |
| M + 2 | First | T4 |
| M + 1 | Second | T0 |
| M 0 | Any | none |
| M − 1 | Any | none |
| M − 2 | Any | none |
| M − 3 | First | T4 |
| M − 4 | Second | T0 |
| M − 5 | Any | none |
| M − 6 | Any | none |
| M − 7 | Any | none |
| M − 8 | First | T4 |

The T0 and T4 data patterns are written in pairs and spaced by three spacing tracks containing any pattern (or no pattern); the characteristics of the pattern on the spacing tracks is irrelevant because these tracks are not written to or read from. The flaw scan system 120 thus requires that only two-fifths of the tracks be written to and read from. The example flaw scan system 120 assumes that, as shown, the location specific anomalies are expected to extend beyond the total width dimensions of eight tracks without independent verification of the tracks that are not directly tested for either the first or the second anomaly type.

The scope of the present invention should thus be determined with respect to the following claims and not the foregoing detailed description.

We claim:

1. A flaw scan system for detecting a location of first and second types of location specific anomalies on a storage medium, comprising:
   a write system for writing a set of bits to the storage medium, the set of bits comprising a first data pattern and a second data pattern, wherein the first data pattern is written to a first set of tracks on the storage medium and the second data pattern is written to a second set of tracks on the storage medium, wherein the first set of tracks alternate with the second set of tracks;
   a read system for reading the set of bits from the storage medium;
   a first anomaly location system for determining locations of the first type of location specific anomaly based on the first data pattern; and
   a second anomaly location system for determining locations of the second type of location specific anomaly based on the second data pattern.

2. A flaw scan system as recited in claim 1, in which the read system generates a read signal based on the set of bits.

3. A flaw scan system as recited in claim 2, in which the first anomaly location system monitors the read signal when the read system is reading data in the first data pattern.

4. A flaw scan system as recited in claim 2, in which the second anomaly location system monitors the read signal when the read system is reading data in the second data pattern.

5. A flaw scan system as recited in claim 3, in which the second anomaly location system monitors the read signal when the read system is reading data in the second data pattern.

6. A flaw scan system as recited in claim 3, in which the first anomaly location system determines a location of anomalies of the first type when the read signal is outside a first predetermined range of parameters.

7. A flaw scan system as recited in claim 3, in which the second anomaly location system determines a location of anomalies of the second type when the read signal is outside a second predetermined range of parameters.

8. A flaw scan system as recited in claim 6, in which the second anomaly location system determines a location of anomalies of the second type when the read signal is outside a second predetermined range of parameters.

9. A flaw scan system as recited in claim 1, in which:
   the first data pattern is associated with a first frequency; and
   the second data pattern is associated with a second frequency;
   wherein
   the second frequency is lower than the first frequency.

10. A flaw scan system as recited in claim 1, in which a total of the tracks in the first and second sets of tracks equals a total number of the tracks on the storage medium.

11. A flaw scan system as recited in claim 1, in which a total of the tracks in the first and second sets of tracks is less than a total number of the tracks on the storage medium.

12. A flaw scan system as recited in claim 11, in which a number of the tracks in the first set of tracks is greater than a number of the tracks in the second set of tracks.

13. A flaw scan system as recited in claim 11, in which a number of the tracks in the second set of tracks is greater than a number of the tracks in the first set of tracks.

14. A flaw scan system as recited in claim 1, wherein the set of bits comprises a third data pattern.

15. A flaw scan system as recited in claim 1, in which the write system writes a second set of bits to the storage medium, the second set of bits comprising the first data pattern and the second data pattern.

16. A flaw scan system as recited in claim 1, in which the read system comprises a Tunneling Magneto Resistive (TuMR) element.

17. A method of detecting a location of first and second types of location specific anomalies on a storage medium, the method comprising:
   writing a set of bits to the storage medium, the set of bits comprising a first data pattern and a second data pattern, wherein writing the set of bits comprises writing the first data pattern to a first set of data storage locations on the storage medium and writing the second data pattern to a second set of data storage locations on the storage medium, wherein a number of the data storage locations in the first set of data storage locations is greater than a number of the data storage locations in the second set of data storage locations;
   reading the set of bits from the storage medium;
   determining locations of the first type of location specific anomaly based on a first portion of the set of bits read from the storage medium associated with the first data pattern; and
   determining locations of the second type of location specific anomaly based on a second portion of the set of bits read from the storage medium associated with the second data pattern.

18. A method as recited in claim 17, further comprising generating a read signal based on the set of bits stored on the storage medium.

19. A method as recited in claim 18, further comprising monitoring the read signal when the read system is reading data in the first data pattern when determining locations of the first type of location specific anomaly.

20. A method as recited in claim 18, further comprising monitoring the read signal when the read system is reading data in the second data pattern when determining locations of the second type of location specific anomaly.

21. A method as recited in claim 19, further comprising monitoring the read signal when the read system is reading data in the second data pattern when determining locations of the second type of location specific anomaly.

22. A method as recited in claim 19, in which the first anomaly location system determines a location of anomalies of the first type when the read signal is outside a first predetermined range of parameters.

23. A method as recited in claim 19, in which the second anomaly location system determines a location of anomalies of the second type when the read signal is outside a second predetermined range of parameters.

24. A method as recited in claim 22, in which the second anomaly location system determines a location of anomalies of the second type when the read signal is outside a second predetermined range of parameters.

25. A method as recited in claim 17, in which:
the first data pattern is associated with a first frequency; and
the second data pattern is associated with a second frequency;
wherein
the second frequency is lower than the first frequency.

26. A method as recited in claim 17, wherein writing the set of bits further comprises writing the set of bits such that the first set of data storage locations alternate with the second set of data storage locations.

27. A method as recited in claim 17, in which a total of the data storage locations in the first and second sets of data storage locations equals a total number of the data storage locations on the storage medium.

28. A method as recited in claim 17, in which a total of the data storage locations in the first and second sets of data storage locations is less than a total number of the data storage locations on the storage medium.

29. A method as recited in claim 17, wherein writing the set of bits comprises writing a third data pattern to the storage medium.

30. A method as recited in claim 17, further comprising writing a second set of bits to the storage medium, the second set of bits comprising the first data pattern and the second data pattern.

31. A data storage system comprising:
a storage medium:
a write system for writing a set of bits to the storage medium, the set of bits comprising a first data pattern and a second data pattern, wherein the first data pattern is written to a first set of data storage locations on the storage medium and the second data pattern is written to a second, different set of data storage locations on the storage medium;
a read system for reading the set of bits from the storage medium;
a first anomaly location system for determining locations of a first type of location specific anomaly on the storage medium based on the first data pattern; and
a second anomaly location system for determining locations of a second type of location specific anomaly on the storage medium based on the second data pattern.

32. A data storage system as recited in claim 31, in which the read system generates a read signal based on the set of bits.

33. A data storage system as recited in claim 32, in which the first anomaly location system monitors the read signal when the read system is reading data in the first data pattern.

34. A data storage system as recited in claim 31, in which the second anomaly location system monitors the read signal when the read system is reading data in the second data pattern.

35. A data storage system as recited in claim 33, in which the second anomaly location system monitors the read signal when the read system is reading data in the second data pattern.

36. A data storage system as recited in claim 33, in which the first anomaly location system determines a location of anomalies of the first type when the read signal is outside a first predetermined range of parameters.

37. A data storage system as recited in claim 33, in which the second anomaly location system determines a location of anomalies of the second type when the read signal is outside a second predetermined range of parameters.

38. A data storage system as recited in claim 36, in which the second anomaly location system determines a location of anomalies of the second type when the read signal is outside a second predetermined range of parameters.

39. A data storage system as recited in claim 31, in which:
the first data pattern is associated with a first frequency; and
the second data pattern is associated with a second frequency;
wherein the second frequency is lower than the first frequency.

40. A data storage system as recited in claim 31, in which the first set of data storage locations alternate with the second set of data storage locations.

41. A data storage system as recited in claim 31, in which a total of the data storage locations in the first and second sets of data storage locations equals a total number of the data storage locations on the storage medium.

42. A data storage system as recited in claim 31, in which a total of the data storage locations in the first and second sets of data storage locations is less than a total number of the data storage locations on the storage medium.

43. A data storage system as recited in claim 42, in which a number of the data storage locations in the first set of data storage locations is greater than a number of the data storage locations in the second set of data storage location.

44. A data storage system as recited in claim 42, in which a number of the data storage locations in the second set of data storage locations is greater than a number of the data storage locations in the first set of data storage locations.

45. A data storage system as recited in claim 31, wherein the set of bits comprises a third data pattern.

46. A data storage system as recited in claim 31, in which the write system writes a second set of bits to the storage medium, the second set of bits comprising the first data pattern and the second data pattern.

47. A data storage system as recited in claim 31, in which the read system comprises a Tunneling Magneto Resistive (TuMR) element.

* * * * *

UNITED STATES PATENT AND TRADEMARK OFFICE
CERTIFICATE OF CORRECTION

PATENT NO.       : 7,646,556 B1                    Page 1 of 1
APPLICATION NO. : 11/484893
DATED            : January 12, 2010
INVENTOR(S)      : Kose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 563 days.

Signed and Sealed this

Sixteenth Day of November, 2010

David J. Kappos
*Director of the United States Patent and Trademark Office*